(12) United States Patent
Yamashita (10) Patent No.: US 7,339,123 B2
(45) Date of Patent: Mar. 4, 2008

(54) ELECTRONIC SCALE FOR MEASURING WEIGHT OF PERSON IN WHEELCHAIR

(75) Inventor: Mikio Yamashita, Asaka (JP)

(73) Assignee: Tanita Corporation, Tokyo (JP)

( * ) Notice: Subject to any disclaimer, the term of this patent is extended or adjusted under 35 U.S.C. 154(b) by 267 days.

(21) Appl. No.: 10/545,693

(22) PCT Filed: Nov. 10, 2004

(86) PCT No.: PCT/IB2004/003680

§ 371 (c)(1),
(2), (4) Date: Aug. 15, 2005

(87) PCT Pub. No.: WO2005/047830

PCT Pub. Date: May 26, 2005

(65) Prior Publication Data

US 2006/0219445 A1   Oct. 5, 2006

Related U.S. Application Data (60) Provisional application No. 60/518,656, filed on Nov. 12, 2003.

(51) Int. Cl.
*G01G 21/28* (2006.01)
(52) U.S. Cl. .................. 177/238; 177/253; 177/262
(58) Field of Classification Search ........ 177/253–263, 177/238
See application file for complete search history.

(56) References Cited

U.S. PATENT DOCUMENTS 2,706,626 A * 4/1955 Reiser ..................... 177/161
3,732,938 A 5/1973 Nelson
3,935,913 A * 2/1976 Wagner et al. ............. 177/134
3,935,914 A 2/1976 Nordstrom et al.
4,056,943 A * 11/1977 Tarrant ..................... 405/196
4,223,752 A * 9/1980 Belcher ..................... 177/211
4,346,771 A * 8/1982 Persson et al. ............ 177/145
4,350,218 A 9/1982 Soederholm et al.
5,133,421 A * 7/1992 Wang ........................ 177/256
5,446,248 A * 8/1995 Strasser ..................... 177/134
5,955,705 A * 9/1999 Germanton ................. 177/126

FOREIGN PATENT DOCUMENTS

JP 09-113344 5/1997
JP 10-232161 9/1998

* cited by examiner

*Primary Examiner*—Randy W Gibson
(74) *Attorney, Agent, or Firm*—McDermott Will & Emery LLP (57) ABSTRACT

A wheelchair scale is provided wherein triangular or trapezoidal box-shaped members are used for forming a support base having a truss structure. The box-shaped members are formed in advance by welding, and are then welded together. Since the welding processes can be performed separately, work efficiency is improved. In addition, since the support base has a truss structure, it supports a large amount of weight without deflection, even though its thickness is relatively small. In addition, the weight of the support base is reduced compared to a conventional base having a pipe structure. Furthermore, because the height of the support base from the floor is reduced compared to a typical conventional structure, a wheelchair can be easily moved onto the support base.

19 Claims, 7 Drawing Sheets

ELECTRONIC SCALE FOR MEASURING WEIGHT OF PERSON IN WHEELCHAIR

This application is a U.S. national phase application of PCT international application PCT/IB2004/003680, filed on Nov. 10, 2004, which in turn claims the benefit of U.S. application No. 60/518,656, filed Nov. 12, 2003, the disclosures of which Applications are incorporated by reference herein.

FIELD OF THE INVENTION

The present invention relates to an electronic scale. The present invention has particular applicability in electronic scales used to measure the weight of a person while sitting in a wheelchair.

BACKGROUND OF THE INVENTION

When a wheelchair scale is used for measuring the weight of a wheelchair user, a wheelchair in which the test subject is sitting is moved onto the scale and the total weight is measured first. Then, the weight of the test subject is determined by subtracting the weight of the wheelchair from the measured weight. If the weight of the wheelchair is known in advance, the weight of the test subject can be determined by inputting the weight of the wheelchair before the measurement and measuring the total weight of the wheelchair and the test subject.

Since the wheelchair scale measures the total weight including the weight of the wheelchair, which is about 100 kg if the wheelchair is an electrical wheelchair, it must have a maximum measurable weight of about 300 kg (about 660 lbs). In addition, since the wheelchair must be pushed manually or moved electrically onto a support base of the wheelchair scale, the height of the wheelchair scale must be as low as about 5 centimeters.

Accordingly, although the support base is generally reinforced by ribs which extend in X and Y directions or rectangular pipes which are joined together by welding, the size of a support base for supporting a wheelchair of about 40 to 75 centimeters or more is about 50 to 80 centimeters or more, and accurate weight measurement is difficult due to the deflection of the support base.

In addition, all of the members such as ribs and pipes must be assembled and successively welded one by one, which is cumbersome since there are a large number of portions to be welded.

SUMMARY OF THE INVENTION

In a wheelchair scale according to the present invention, triangular or trapezoidal box-shaped members used for forming a support base having a truss structure are formed in advance by welding, and then the box-shaped members are welded together. Since the welding processes can be performed separately, work efficiency is improved. In addition, since the support base has a truss structure, it can support 300 kg without deflection, even though its thickness is only about 2.5 centimeters. In addition, the weight of the support base is reduced compared to a conventional based having a pipe structure. Furthermore, the height of the support base from the floor is reduced by about 1.3 centimeters from that of a typical conventional structure, which is about 5 centimeters, to about 3.7 centimeters, and therefore a wheelchair can be easily moved onto the support base.

Additional advantages of the present invention will become readily apparent to those skilled in this art from the following detailed description, wherein only a few embodiments of the present invention are shown and described, simply by way of illustration of the best mode contemplated for carrying out the present invention. As will be realized, the present invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIGS. 14A-1 to 14D-2 show box-shaped members of the measurement platform of FIG. 12.

DETAILED DESCRIPTION OF THE INVENTION

Figure 1:
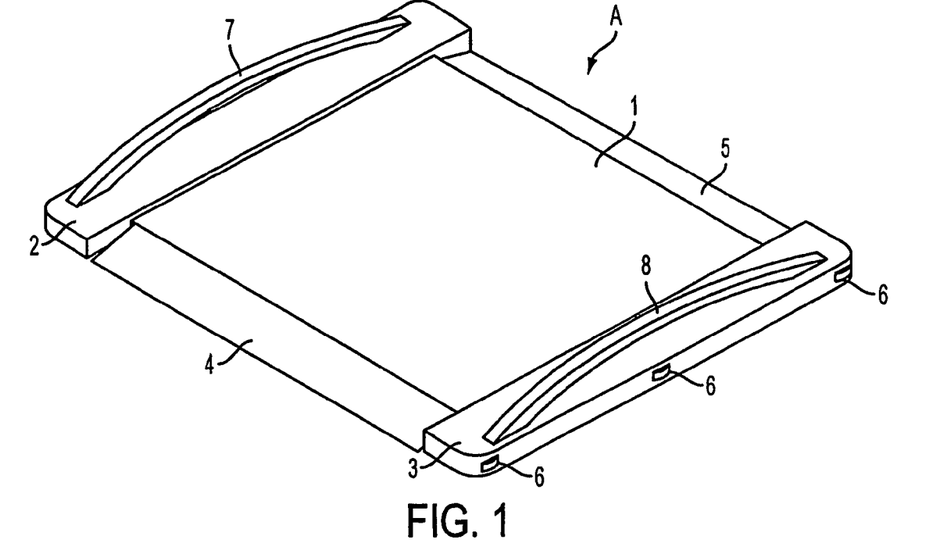
FIG. 1 is a perspective view showing a measurement platform of a wheelchair scale according to a first embodiment of the present invention.

FIG. 1 is a perspective view showing a measurement platform A of a wheelchair scale according to a first embodiment of the present invention. A circuit board (not shown) used for measurement is disposed in the measurement platform A, and an external display/operation unit (not shown) is connected to the circuit board with a cable.

The measurement platform A has a support base 1 at the center thereof, and side frames 2 and 3 are placed on both sides of the support base 1. In addition, slopes 4 and 5 are provided on the front and back of the support base 1 so that a wheelchair can be easily moved onto the support base 1.

Casters 6 are provided on the sides of the side frames 2 and 3 so that the measurement platform A can be moved by grabbing one of handles 7 and 8 provided on the side frames 2 and 3, respectively.

Three wheels are provided on each side in the form of the casters 6, and the wheel in the middle of each side projects slightly further than the other two wheels on the same side. Because the wheel in the middle projects further than the other wheels on the same side, the measurement platform A can be held in an upright position while only the wheel in the middle is in contact with the ground and the orientation of the measurement platform A can be easily changed around this wheel. When the measurement platform A is moved, two wheels are used; i.e., the wheel in the middle and one of the other wheels on the same side.

Figure 2:
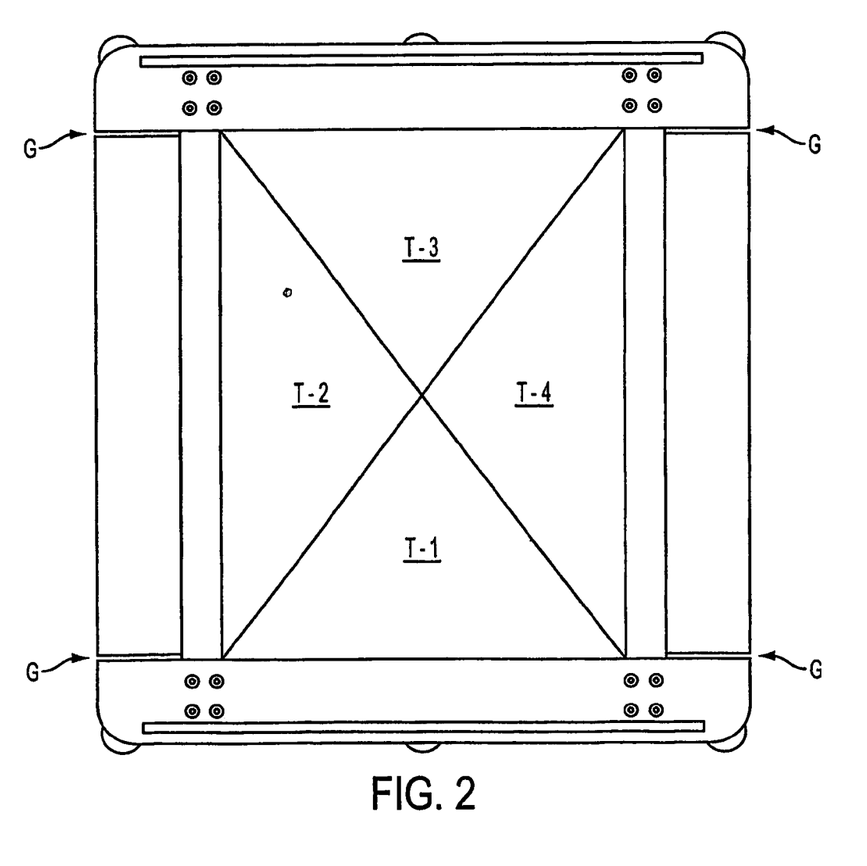
FIG. 2 is a plan view of the measurement platform of FIG. 1.

FIG. 2 is a plan view of the measurement platform A shown in FIG. 1 where a top sheet laminated on the top surfaces of the slope 4, the support base 1, and the slope 5 is removed.

Figure 5:
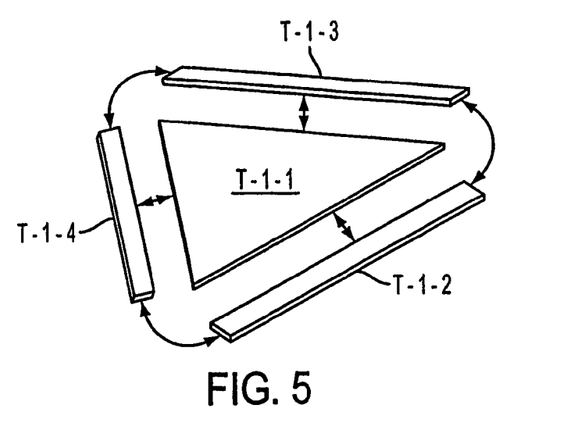
FIG. 5 is an exploded view of a triangular box used in the support base of FIGS. 3 and 4.

The support base 1 includes four triangular boxes T-1, T-2, T-3, and T-4. As shown in FIG. 5, the triangular box T-1 includes a triangular bottom plate T-1-1 and three side plates T-1-2, T-1-3, and T-1-4, and a triangular box with an open side is obtained by welding the edges of these plates to the bottom plate T-1-1. The triangular box can be more easily manufactured by cutting out the bottom plate T-1-1 and the three sides plates T-1-2, T-1-3, and T-1-4 together from a single plate without separating them, forming the triangular box by bending, and welding only the corners of the resulting triangular box. The other triangular boxes T-2, T-3, and T-4 are constructed similarly to the triangular box T-1.

Figure 3:
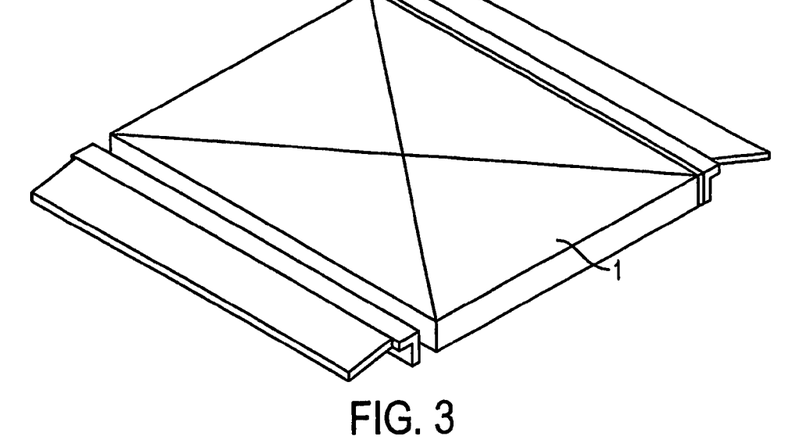
FIG. 3 is a top perspective view of a support base according to the present invention.

As shown in FIG. 3, the rectangular support base 1 is assembled by disposing the four triangular boxes T-1, T-2, T-3, and T-4 such that the side surfaces thereof face each other, and welding the top and bottom portions of the boxes together.

Figure 6:
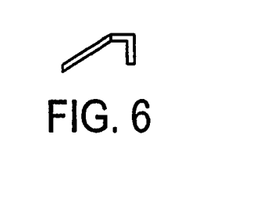
FIG. 6 is a cross-sectional view of the slopes 4, 5 of the measurement platform of FIG. 1.

The slopes 4 and 5, whose cross-sectional shape is shown in FIG. 6, are integrated onto the support base 1 by placing them such that the side surfaces of the slopes 4 and 5 face the corresponding side surfaces of the support base 1, and welding them from the top and bottom.

After the slopes 4 and 5 are integrated onto the support base 1, the side frames 2 and 3 are placed such that the side surfaces of the side frames 2 and 3 face the left and right side surfaces of the support base 1 and are welded from the top and bottom. Accordingly, the structure shown in FIG. 1 is obtained.

Before a wheelchair is moved onto the support base 1, the outer edges of the slopes 4 and 5 move downward and come into contact with the installation surface, such as a floor, so that the wheelchair can be easily moved onto the support base. Therefore, the length of the outer edges of the slopes 4 and 5 is smaller than the width of the support base 1, and gaps 6 are provided between each of the slopes 4 and 5 and the side frames 2 and 3 (see FIG. 2). After the wheelchair is moved onto the support base 1, the slopes 4 and 5 return to their original positions and move away from the installation surface so that the weight measurement is not affected.

Figure 4:
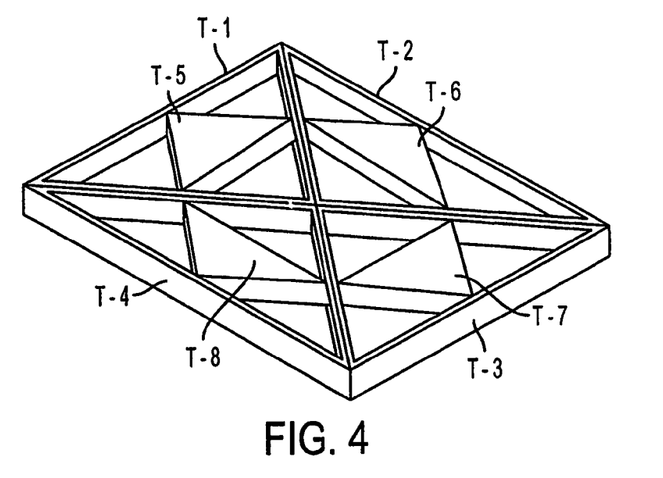
FIG. 4 is a bottom perspective view of the support base of FIG. 3.

As shown in FIG. 4, which is a bottom view of the support base 1, another four triangular boxes T-5, T-6, T-7, and T-8 constructed by the method shown in FIG. 5 or by other means are inserted into the triangular boxes T-1, T-2, T-3, and T-4, respectively, from the open side thereof. The triangular boxes T-5, T-6, T-7, and T-8 are bonded to the triangular boxes T-1, T-2, T-3, and T-4, respectively, by welding the portions which are in contact with the bottom plates and side plates of the triangular boxes T-1, T-2, T-3, and T-4.

Accordingly, a truss structure is obtained by combining the eight triangular boxes together by welding. Due to this truss structure, and since load is received by the side plates of the triangular boxes, high resistance to torsion and deflection is achieved.

Figures 7, 8, 9:
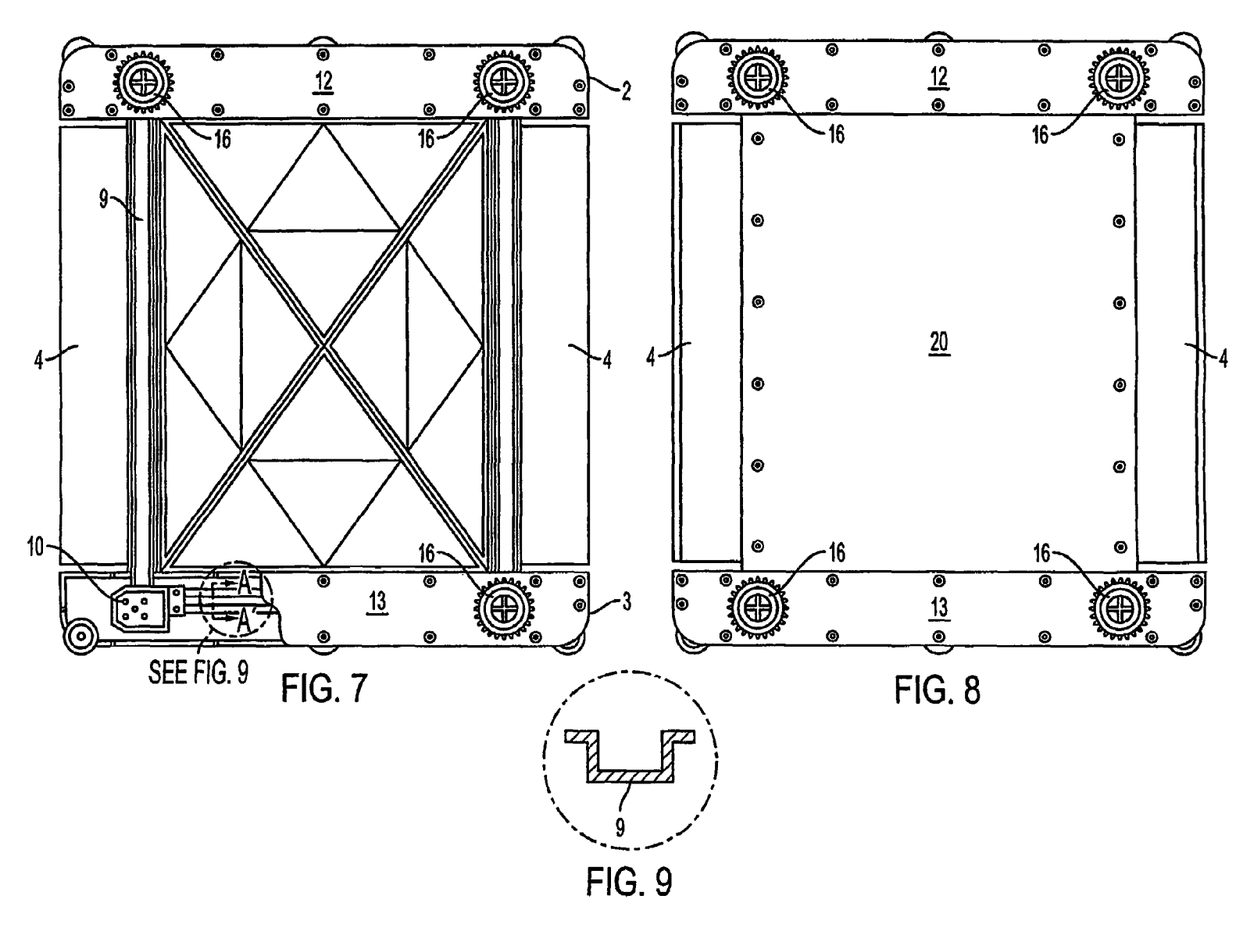
FIG. 7 is a partial cutaway view of the measurement platform of FIG. 1.
FIG. 8 is a bottom view of the measurement platform of FIG. 1.
FIG. 9 is a cross-section view taken through line A-A' of FIG. 7.

As shown in FIG. 7, which is a bottom view of the measurement platform A, the slopes 4 and 5 and the side frames 2 and 3 are joined to support base 1 by welding. Each of the side frames 2 and 3 includes an intermediate frame 9 and a pair of frame-connecting plates 10, one at each end of intermediate frame 9. As shown in FIG. 9, which is a cross-sectional view taken through line A-A' of FIG. 7, intermediate frame 9 has a bracket-shaped cross-section which faces downward. Side-frame bottom plates 12 and 13 are attached on the bottom of the side frames 2 and 3, respectively, with screws, as shown in FIG. 8.

Referring again to FIG. 7, four intermediate frames 9 are arranged in a rectangle, and the frame-connecting plates 10 are disposed on the corners of the rectangle. The intermediate frames 9 running along the front and back are welded to the frame-connecting plates 10, and the intermediate frames 9 running along the left and right side frames 2,3 are fixed to the frame-connecting plates 10 with screws.

Figure 10:
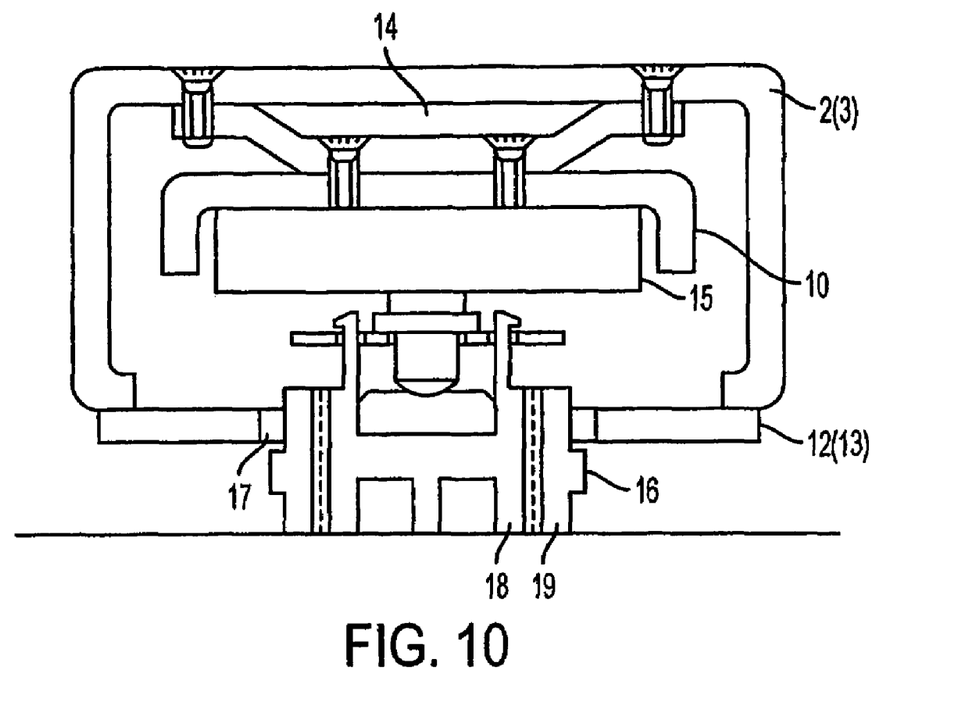
FIG. 10 is a cross-sectional view of side frames 2, 3 of FIG. 7.

As shown in FIG. 10, which is a cross-sectional view of side frames 2 and 3, each of the frame-connecting plates 10 is connected to the top surface of the corresponding side frame 2 or 3 with a load-transmitting plate 14 interposed therebetween.

Figure 11:
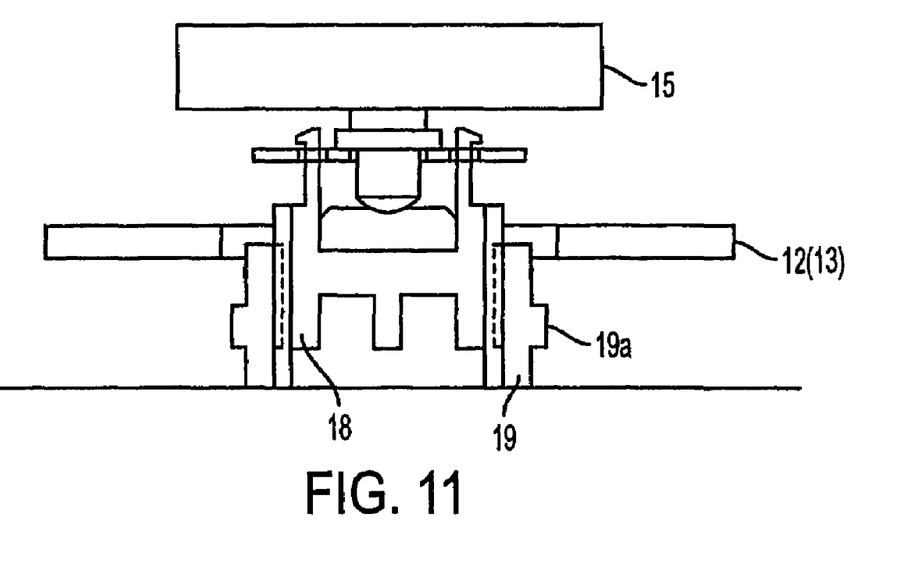
FIG. 11 is a cross-sectional view of leg portion 16 of FIG. 7.

In addition, a load sensor 15 is connected to the bottom surface of the frame-connecting plate 10 with connecting means (not shown). The load sensor 15 has a conventional structure, and a leg portion 16 which projects downward through a hole 17 formed in the corresponding side-frame bottom plate 12 or 13 and is in contact with the installation surface such as the floor. In one embodiment of the present invention, the leg portion 16 includes an internal screw 18, which receives the load from the load sensor 15, and an adjuster screw 19. The height of the load sensor 15 can be changed, as shown in FIG. 11, by grabbing and rotating a projecting portion 19a provided on the outer periphery of the adjuster screw 19. Thus, the measurement platform A can be maintained horizontal.

One load sensor 15 is provided under each of the four frame-connecting plates 10 at the corners of the rectangle formed by the intermediate frames 9, resulting in a four-point scale.

With reference to FIG. 8, which is a bottom view of the measurement platform A, a bottom plate 20 is attached on the bottom of the support base 1 with screws.

Next, the manner in which load is transmitted in the measurement platform A will be described. When the wheelchair in which a test subject is sitting is moved onto the support base 1, the total load including that of the wheelchair is applied to the triangular boxes T-1 to T-8 and is transmitted to the side frames 2 and 3. The load is transmitted from the side frames 2 and 3 to the frame-connecting plates 10 via the load-transmitting plates 14. The load received by the frame-connecting plates 10 is transmitted to the load sensors 15, and the weight measurement is performed by the load sensors 15.

Even when the support base 1 is deformed due to the load applied, the deformation is absorbed and reduced by the intermediate frames 9 and the frame-connecting plates 10, and does not effect the measurement performed by the load sensors 15.

Although eight triangular boxes are used to form the support base 1 in the above-described embodiment, the shape of the boxes may be changed for installing the circuit board, etc., in the support base 1.

Figure 12:
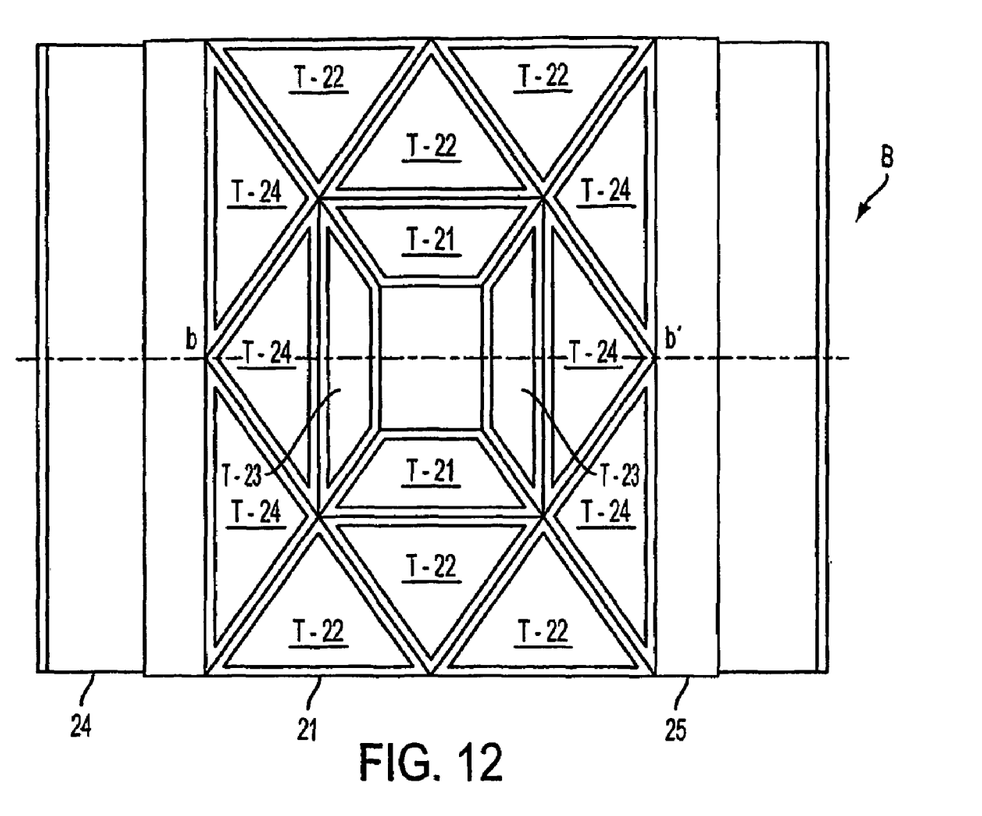
FIG. 12 is a bottom view of a measurement platform according to a second embodiment of the present invention.
Figure 13:
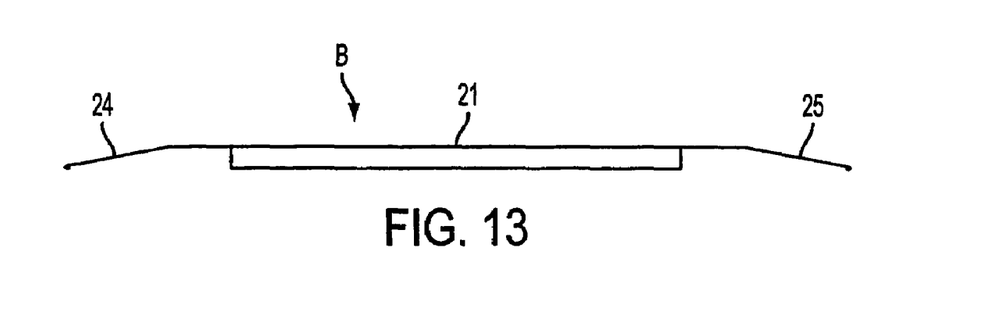
FIG. 13 is a side view of the measurement platform of FIG. 12.

FIG. 12 is a bottom view of a measurement platform B of a wheelchair scale according to a second embodiment of the present invention, wherein a bottom plate defining the bottom surface is removed to show the inner structure of the measurement platform B. FIG. 13 is a side view of the measurement platform B. Slopes 24 and 25 are provided on the side surfaces of a support base 21.

This wheelchair scale is similar to the wheelchair scale according to the above-described first embodiment of the present invention except for the inner structure thereof. In addition, the perspective view of this wheelchair scale is similar to that shown in FIG. 1, and explanations thereof are thus omitted.

FIGS. 14A-1 to 14D-2 depict box-shaped members used for forming the support base 21 shown in FIG. 12, which has a truss structure. Four kinds of box-shaped members T-21 (see FIGS. 14A-1 and 14A-2), T-22 (see FIGS. 14B-1 and 14B-2), T-23 (see FIGS. 14C-1 and 14C-2), and T-24 (see FIGS. 14D-1 and 14D-2) are used, and the inner structure of the support base 21 is formed by combining these box-shaped members. In the above-described first embodiment, each box is formed by combining a bottom plate and side plates, as shown in FIG. 5. In comparison, the box-shaped members used in the second embodiment do not have a bottom plate and are formed simply by combining a plurality of side plates. In addition, in the wheelchair scale according to the first embodiment, the support base 1 is formed by combining a plurality of triangular boxes, as shown in FIGS. 3 to 6. In the wheelchair scale according to the second embodiment of the present invention, the shape of the box-shaped members included in the support base 21 is not limited to a triangle. Polygonal or trapezoidal box-shaped members may also be used. Although the box-shaped members can have a triangular shape to ensure structural stability, they can also have other shapes as long as the space in the support base 21 is sufficiently divided and the box-shaped members function as ribs.

The side plates of the box-shaped members are not simple rectangular parallelepipeds, but are bent inward at the top and bottom, as shown in FIGS. 14A-1 to 14D-2.

Figure 14A:
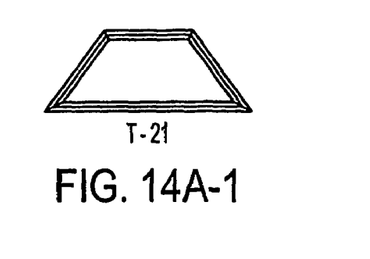
Figure 14A:
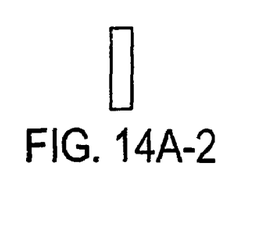
Figure 14B:
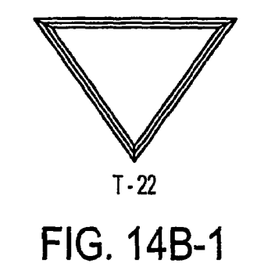
Figure 14B:
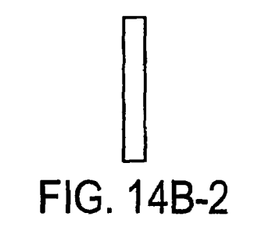
Figure 14C:
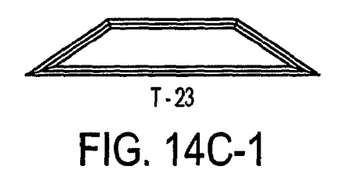
Figure 14C:
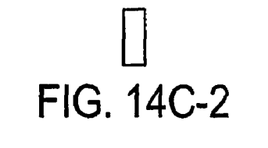
Figure 14D:
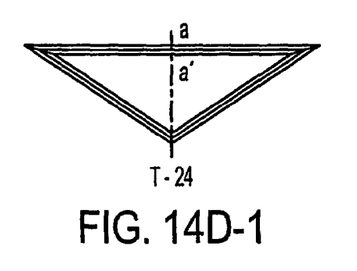
Figure 14D:
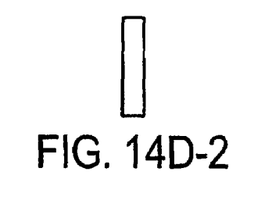
Figure 15:
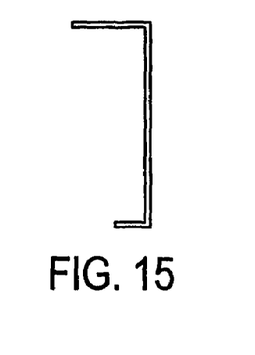
FIG. 15 is a cross-sectional view taken through line a-a' of FIG. 14D-1.

FIG. 15 is a sectional view of the box-shaped member T-24 shown in FIG. 14D-1 taken along the a-a'. As shown in FIG. 15, each of the side plates used in the second embodiment has a bracket shape in cross section. This provides an effect similar to that obtained if the thickness of each side plate were to be increased, and deformation such as buckling is thereby prevented.

Figure 16:
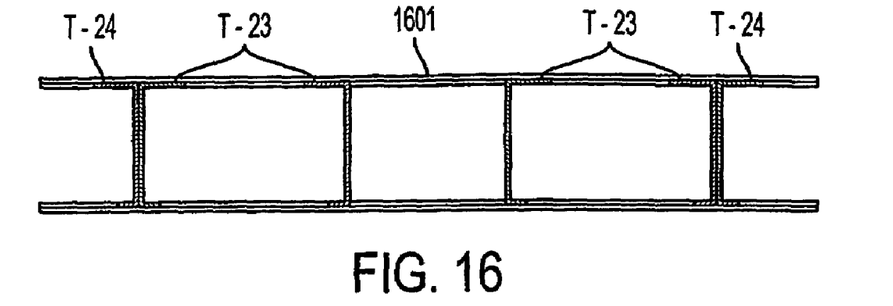
FIG. 16 is a cross-sectional view taken through line b-b' of FIG. 12.

FIG. 16 is a sectional view of FIG. 12 taken along line b-b'. As shown in FIG. 16, the side plates of adjacent box-shaped members T-23, T-24 are in contact with each other without a gap, and are welded to each other. In addition, an upper portion of each side plate, which is bent inward, is fixed to a top plate 1601 defining the top surface of the support base 21 by welding. When a load is placed on the structure from above, the upper portion of each side plate receives a compression force and a lower portion of the side plate receives a tension force. The influence of the compression force can be reduced by welding the upper portion of each side plate to the top plate 1601, and deformation of the side plate can be suppressed accordingly.

The above-described structure is stronger than the structure of the first embodiment, and a heavier load can therefore be received.

The strength of the inner structure of the support base 21 is further increased by welding the adjacent box-shaped members to each other at contact portions thereof.

The structure of a load sensor for measuring the weight is similar to that of the load sensor shown in FIGS. 10 and 11, and explanations thereof are thus omitted.

Figure 17:
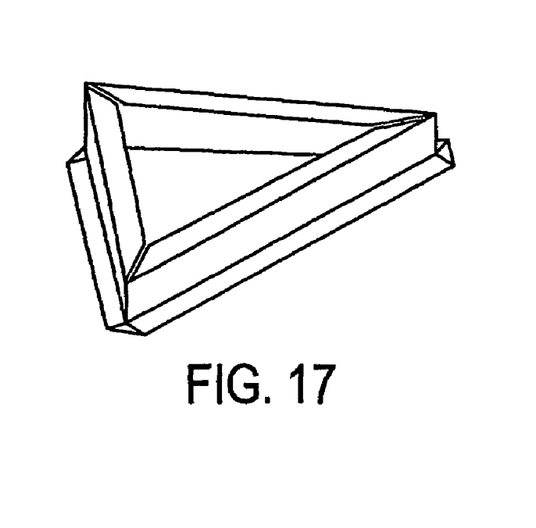
FIG. 17 shows a box-shaped member according to an embodiment of the present invention.
Figure 18:
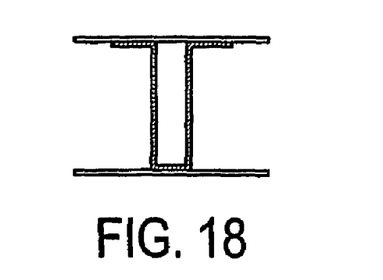
FIG. 18 is a cross-sectional view of a support base according to an embodiment of the present invention.

FIG. 17 shows a box-shaped member in which an upper portion of each side plate is bent inward and a lower portion thereof is bent outward. When a support base is formed by combining boxes similar to this, as shown in FIG. 18, the side plates of the adjacent boxes cannot come into contact with each other, and therefore the adjacent side plates cannot be welded to each other. However, since the upper and lower portions of the side plates are bent, the load is dispersed and the strength is increased compared to the structure of the first embodiment. The wheelchair scale according to the present invention may also have such a structure.

The present invention has been described as it relates to the structure of a wheelchair scale with which a wheelchair user can measure his or her weight without getting off the wheelchair. However, since the scale according to the present invention is thin and strong, it can also be used for measuring the weight of objects which are difficult to lift, such as a cart with a load, so the application thereof is not limited to wheelchairs.

The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only a few embodiments of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A scale having a support base, the support base having a truss structure comprising a plurality of box-shaped members rigidly joined together;

wherein the box-shaped members are triangular or trapezoidal in plan view;

wherein the box-shaped members each comprise a plurality of side plates;

wherein the side plates of each box-shaped member are separate from the side plates of the other box-shaped members; and wherein the box-shaped members are rigidly joined together with one of their side plates aligned substantially parallel to and abutting a side plate of an adjacent box-shaped member.

2. The scale of claim 1, wherein the box-shaped members each comprise a bottom plate.

3. The scale of claim 1, wherein the side plates each have a U-shaped cross-section.

4. A scale having a support base, the support base having a truss structure comprising a plurality of box-shaped members rigidly joined together;

wherein the box-shaped members are triangular or trapezoidal; and wherein the box-shaped members each comprise a plurality of side plates, the side plates each having an inwardly-bent upper portion and an outwardly-bent lower portion.

5. The scale of claim 3 or 4, wherein the support base further comprises a top plate rigidly attached to the box-shaped members.

6. A scale having a support base, the support base having a truss structure comprising a plurality of box-shaped members rigidly joined together;

wherein the box-shaped members are triangular or trapezoidal;

wherein the box-shaped members each comprise a bottom plate and a plurality of side plates; and wherein the box-shaped members comprise four large triangular box-shaped members and four small triangular box-shaped members, one of the small triangular box-shaped members being disposed within each of the respective large triangular box-shaped members.

7. The scale of claim 3 or 4, wherein the truss structure includes both triangular and trapezoidal box-shaped members.

8. The scale of claim 1, further comprising a pair of side frames rigidly attached to respective opposing sides of the support base.

9. The scale of claim 8, further comprising a plurality of load transmitting plates attached to the side frames, one of the load transmitting plates being disposed proximal each corner of the support base.

10. The scale of claim 9, further comprising a frame-connecting plate attached to each of the load transmitting plates, and an intermediate frame member extending between and attached to each adjacent pair of the frame-connecting plates.

11. The scale of claim 10, further comprising a load sensor attached to each of the frame-connecting plates.

12. The scale of claim 8, further comprising a slope rigidly attached to the support base between the side frames, the slope having a length less than a width of the support base between the side frames such that a gap exists between the slope and the side frames.

13. The scale of claim 8, further comprising a plurality of wheels for moving the scale when it is in an upright position, the wheels extending laterally from one of the side frames.

14. The scale of claim 13, wherein one of the wheels extends further than the other wheels, to facilitate orienting the scale when it is in the upright position.

15. A method of manufacturing a scale having a support base, the support base having a truss structure, the method comprising:

providing a plurality of trapezoidal or triangular box-shaped members, each member having a bottom plate and a plurality of side plates with side surfaces;

aligning the members such that a plurality of the side surfaces face each other; and welding the members to each other to form the truss structure.

16. The method of claim 15, wherein providing the box-shaped members comprises:

providing the bottom plate and the plurality of side plates of each member separately from each other; and welding the side plates of each respective member to the bottom plate of that member.

17. The method of claim 15, wherein providing the box-shaped members comprises:

providing the bottom plate and the plurality of side plates of each member as a single piece;

bending the side plates relative to the bottom plate to form a box shape; and welding the corners of the box-shaped member.

18. A method of manufacturing a scale having a support base, the support base having a truss structure, the method comprising:

providing a plurality of trapezoidal or triangular box-shaped members, each member having a plurality of side plates with flanges;

aligning the members such that adjacent ones of the members contact each other substantially without gaps; and welding the members to each other to form the truss structure.

19. The method of claim 18, further comprising welding the flanges to a top plate.

* * * * *